Patented Feb. 6, 1951

2,540,748

UNITED STATES PATENT OFFICE 2,540,748

POLYVINYL CARBAZOLE COMPOSITION

Warren F. Busse, Easton, Pa., assignor to General Aniline & Film Corporation, New York, N. Y., a corporation of Delaware No Drawing. Application October 12, 1945,
Serial No. 622,083

1 Claim. (Cl. 260—33.6)

The present invention relates to a novel dielectric material comprising a mixture of a polymeric N-vinyl pyrrole compound and a powdered solid inorganic compound having a dielectric constant higher than 10, such as a wide variety of titanium compounds, for instance rutile type titanium dioxide and numerous titanates, such as the alkaline earth metal titanates. This novel dielectric material possesses a unique combination of properties, electrical and physical, not possessed by dielectric materials which have heretofore been available. Thus, it not only has desirable electric properties, such as a high dielectric constant and a low power factor, but in addition, has desirable physical properties which greatly facilitate its use as a practical dielectric material and which are not possessed by other dielectric materials which may have the high dielectric constant possessed by the materials of this invention. This combination of properties, electrical and physical, provides a novel material having a wide field of use in the arts.

The polymeric N-vinyl pyrrole compounds, which are one component of the novel dielectric material of this invention, have found important uses in the electrical arts, since they possess many properties which are of value in this field. Thus, they have a low power factor and, in addition, possess a relatively high heat distortion point which makes them suitable for use at relatively high temperatures, and also possess satisfactory mechanical properties. However, the dielectric constant of such polymeric N-vinyl pyrrole compounds averages slightly less than 3, so that they are unsuitable for use as a dielectric material in applications which require a compound having a higher dielectric constant.

Numerous titaniferous compounds which have a dielectric constant higher than 10 are known and have found important applications as solid dielectric materials of high dielectric constant and stable over 100° C., generally in the form of fired bodies of titanium dioxide (rutile), or other titaniferous compounds, such as the alkaline earth metal titanates. However, their usefulness has been limited by the fact that they cannot be fired to close tolerances, as is typical of ceramics, and after firing, can be shaped only by expensive grinding processes. Not only are such titanate dielectrics difficult to shape, but it is impossible to produce them in a form satisfactory for many uses. Thus, it is manifestly impossible to produce uniform sheets of such materials.

It has now been found that by incorporating titanium compounds having a dielectric constant higher than 10, in polymeric N-vinyl pyrrole compounds, the resulting mixture has physical properties which permits it to be readily cast or molded in accordance with the usual procedures for casting or shaping organic polymers, and shaped articles produced from such mixtures not only have physical properties of flexural strength and high heat distortion temperature common to shaped articles produced from polymeric N-vinyl pyrrole compounds containing inorganic fillers but, in addition, have a greatly increased dielectric constant which has not heretofore been obtainable in combination with the other desirable physical properties. By control of the composition of the mixture and selection of the titaniferous compound employed, the dielectric constant of the resulting composition can be varied from that of the polymeric N-vinyl pyrrole compound per se, which averages slightly under 3 in the case of polyvinyl carbazole, to higher values, such as 15, 20, 25 or even higher.

The polymeric N-vinyl pyrrole compounds which have been found to be particularly valuable for use in the present invention comprise N-vinyl pyrrole compounds containing the pyrrole ring, such as N-vinyl pyrrole, N-vinyl carbazole, N-vinyl tetracarbazole, N-vinyl indole and N-vinyl naphthocarbazole. Polymeric N-vinyl carbazole has been found particularly useful and since this material is commercially available, the present invention will be described particularly in connection with its use, but it should be understood that other N-vinyl pyrrole compounds may be substituted therefor. As is common with most organic polymers, a relatively wide range of polymers of N-vinyl carbazole, as regards molecular weight of the polymer, can be obtained. While it has been found that both the low and high polymers of N-vinyl carbazole are suitable for use in the present invention, it is preferable, as a general rule, to employ a polymeric material containing a substantial amount of reasonably high polymer since, in general, the higher polymers of N-vinyl carbazole have better mechanical strength than does a relatively low polymer. Satisfactory products may be produced in accordance with the present invention from either powdered polyvinyl carbazole or fibered polyvinyl carbazole produced in accordance with United States Patent No. 2,185,789 or mixtures of the same. If desired, various plasticizers may be incorporated in the polymeric N-vinyl carbazole in order to facilitate molding or casting articles from the composition of the present invention and to assist in imparting desired mechanical properties to the finished articles. In general, when employing a plasticizer, it is preferable to employ a non-polar compound since these exert less influence on the electrical properties of the finished article. Among the plasticizers which have been found to be suitable for use are a partially hydrogenated terphenyl Monsanto HB-40 more fully described on the front cover, vol. 52, No. 3 of Chemical Industries for March 1943 and in Chemicals and Plastics, 28th ed. published by Monsanto Chemical Company, page 66, diamylnaphthalene, tricresyl phosphate and the like. Small amounts (up to 5 to 10%) of materials like polystyrene also may be used without serious deleterious effect on the heat distortion point.

The titanium compounds which are employed as the other components of the composition of the present invention comprise titanium dioxide and a wide variety of titanates of various materials. Titanates containing varying amounts of such metals as zirconium, tin, beryllium, cadmium, copper, aluminum, boron, cerium, lead tantalum, chromium, cobalt, manganese, nickel, silicon, and tungsten and particularly the alkaline earth metal titanates, such as calcium, cerium, magnesium and strontium, and mixtures of the same, or mixed titanates, such as calcium-barium titanates, can be made in forms having high dielectric constants, greater than 10, and have been found to be suitable for use in the present invention.

In preparing the novel dielectric materials of the present invention, the polymeric N-vinyl pyrrole compound and the titanium compound may be mixed in any desired manner, so long as a uniform intimate mixture is obtained. Satisfactory products have been produced by thorough mechanical mixing of powdered titanates and finely divided polyvinyl carbazole. However, if desired, the powdered titanates may be added to a solution of polymeric N-vinyl pyrrole compound in a solvent therefor. In this case, a sufficient amount of volatile solvent may be added to the polyvinyl N-vinyl pyrrole compound to soften the same so as to form a doughy mass in which the titanium compound is incorporated by thorough mixing, or if desired, a larger amount of solvent may be employed so as to form a liquid mass. After the desired amount of titanium compound has been incorporated in the solution of polymeric N-vinyl pyrrole compound and solvent and mixed so as to uniformly distribute the titanate throughout the solution, the solvent may be evaporated so as to leave a solid mixture of polyvinyl N-vinyl pyrrole compound and titanate or if desired, the solvent may be removed by precipitating the polymeric N-vinyl pyrrole compound by addition of a non-solvent therefor, for instance, methanol, while agitating the mixture. When this is done, it has been found that as the N-vinyl pyrrole compound is precipitated it entraps the dispersed titanium compound. The precipitated solids, when filtered off and dried, yield a solid material in which the titanate particles are uniformly distributed throughout the polymer.

The thus-obtained mixture of polymeric N-vinyl pyrrole compound and titanium compound can readily be formed into shaped articles by the usual molding and casting procedures. Thus, the conventional compression or injection molding procedures may be employed to produce a wide variety of shaped articles. Such articles as films may be produced by usual methods, such as by casting from a solution of the polymer in a volatile solvent, followed by evaporation of the solvent.

In order to better illustrate the present invention, there are given below, in tabular form, a number of specific examples of dielectric materials produced in accordance with the present invention, the amounts of each ingredient are given in parts by weight. The polymer employed in these examples was N-vinyl carbazole having a dielectric constant of 2.96 and was ground to pass 35 mesh screen. The titanates employed were ground to pass 100 mesh screen. In those examples where a plasticizer was employed, the material employed was a hydrogenated terphenyl derivative (Monsanto HB-40) having a distillation range of 353-393° C. and a power factor of 0.2% at 1 mc. The titanate was incorporated in the polymer by thorough mechanical mixing in Examples 1, 2 and 4-9, while in Examples 3 and 10, the titanate was added to a 20% solution of the polymer in benzene and the polymer precipitated by the addition of methanol while agitating the solution in a Waring Blender. The precipitated solids were then filtered off and dried. All of the samples listed in the table were shaped by compression molding in a heated die under a pressure of 5 tons and in the temperature range of 240-270° C. On ejection from the mold, the samples were a very light gray in color, but as with the titanates themselves, when exposed to sunlight, they turned pink.

Table

| Sample No. | Titanate | | Polymer | | Percent Power Factor | | Dielectric Constant | |
|---|---|---|---|---|---|---|---|---|
| | Kind | Amount in sample | Amount Polymeric N-vinyl Carbazole | Amount Plasticizer | 1 kc. | 1 mc. | 1 kc. | 1 mc. |
| 1 | BaSr(TiO$_3$)$_2$ | 25 | 100 | | 0.18 | 0.10 | 6.5 | 6.5 |
| 2 | do | 50 | 100 | | 1.5 | 0.17 | 11.3 | 11.1 |
| 3 | do | 66⅔ | 95 | 5 | 0.36 | 0.10 | 23.0 | 23.7 |
| 4 | TiO$_2$ | 25 | 100 | | 0.83 | 0.69 | 6.9 | 6.5 |
| 5 | do | 50 | 100 | | 2.9 | 1.3 | 16.8 | 15.2 |
| 6 | do | 66⅔ | 95 | 5 | 2.5 | 0.80 | 31.8 | 28.8 |
| 7 | SrTiO$_3$ | 50 | 90 | 10 | 0.46 | 0.22 | 6.4 | 6.3 |
| 8 | do | 60 | 90 | 10 | 0.58 | 0.18 | 8.6 | 8.3 |
| 9 | do | 70 | 90 | 10 | 0.81 | 0.22 | 12.9 | 12.7 |
| 10 | do | 75 | 90 | 10 | | 0.23 | | 17.2 |

I claim:

A heat softenable dielectric composition having a softening point over 100° C., a dielectric constant within the range of 6.3 to 31.8, and which is moldable under heat and pressure, consisting of an intimate uniform mixture of from 50 to 75 parts by weight of a titanium compound in finely divided form so as to pass a 100-mesh screen, said titanium compound having a high dielectric constant greater than 10 and being selected from the group consisting of rutile form titanium dioxide and alkaline earth metal titanates, and 100 parts by weight of a plasticized high molecular weight polyvinyl carbazole, wherein the plasticizer consists of from 5-10% of the weight of said poly N-vinyl carbazole of a partially hydrogenated terphenyl having a distillation range of about 353-393° C. and a power factor of 0.2% at 1 mc.

WARREN F. BUSSE.

REFERENCES CITED

The following references are of record in the file of this patent:

UNITED STATES PATENTS

| Number | Name | Date |
|---|---|---|
| 2,072,465 | Reppe et al. | Mar. 2, 1937 |
| 2,364,790 | Hemming | Dec. 12, 1944 |
| 2,406,319 | Brooks et al. | Aug. 27, 1946 |